(12) United States Patent
Niimi et al.

(10) Patent No.: US 12,736,092 B2
(45) Date of Patent: Sep. 15, 2026

(54) CLUTCH DRIVER OF EMERGENCY CUT-OFF DEVICE

(71) Applicant: KAWASAKI JUKOGYO KABUSHIKI KAISHA, Kobe (JP)

(72) Inventors: Takamasa Niimi, Kobe (JP); Kenichiro Tanaka, Kobe (JP); Takuya Matsumoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 19/132,140

(22) PCT Filed: Dec. 2, 2022

(86) PCT No.: PCT/JP2022/044553

§ 371 (c)(1),
(2) Date: May 22, 2025

(87) PCT Pub. No.: WO2024/116404

PCT Pub. Date: Jun. 6, 2024

(65) Prior Publication Data

US 2026/0194112 A1 Jul. 9, 2026

(51) Int. Cl.

| | |
|---|---|
| ***F16D 11/04*** | (2006.01) |
| ***F02C 7/32*** | (2006.01) |
| ***F16D 23/12*** | (2006.01) |
| ***H02K 7/10*** | (2006.01) |

(52) U.S. Cl.

CPC ................ *F16D 11/04* (2013.01); *F02C 7/32* (2013.01); *F16D 23/12* (2013.01); *H02K 7/10* (2013.01); *F16D 2023/123* (2013.01); *F16D 2300/20* (2021.01)

(58) Field of Classification Search

CPC .......... F16D 11/04; F16D 11/14; F16D 23/12; F16D 2023/123; F16D 2300/20; F02C 7/32; F02C 7/36; H02K 7/10; H02K 7/1823

USPC ........................................................ 192/69.2

See application file for complete search history.

(56) References Cited

U.S. PATENT DOCUMENTS 2,642,970 A * 6/1953 Szekely .................. F16D 11/04 192/24
4,042,088 A * 8/1977 Schmohe ................ F16D 11/04 192/114 R
4,936,247 A 6/1990 Sundstrom
4,989,707 A * 2/1991 Doty ....................... F16D 11/04 74/15.66

(Continued)

FOREIGN PATENT DOCUMENTS

JP 2-108901 A 4/1990

*Primary Examiner* — Richard M Lorence
(74) *Attorney, Agent, or Firm* — Sughrue Mion, PLLC

(57) ABSTRACT

A clutch driver of an emergency cut-off device drives a clutch including: an engaged body that rotates integrally with a first shaft; and an engaging body that rotates integrally with a second shaft, includes a first screw thread on an outer peripheral surface of the engaging body, and is disengaged from the engaged body by being displaced in an axial direction in which an axis of the second shaft extends. The clutch driver includes a base, a puller, a pushing spring, an outside shaft, an inside shaft, and a positioner. When the clutch driver transitions from a stand-by state to an operating state, the positioner maintains the position of the outside shaft relative to the base in a front-rear direction.

6 Claims, 11 Drawing Sheets

(56) References Cited

U.S. PATENT DOCUMENTS

| | | | | |
|---|---|---|---|---|
| 5,103,949 A * | 4/1992 | Vanderzyden | .......... | F16D 11/04<br>192/24 |
| 2017/0016489 A1* | 1/2017 | Grosskopf | ............. | F16D 23/12 |

* cited by examiner 38
63b
63c
61
72b
D1
31
7
36 (80)
42
73a
13
41
33
54
34
35
12
62a
62
37
32
3
52a
22a
21
22
X
1
2
REAR
Y
FRONT R
38
163b
172b
163
172
172a
163a
D1
7
54
173a
180
136
181
164a
REAR
13
164
173
Y
41
33
42
FRONT
134
135
112
37
103
32
11
21
22
22a
52a
X
1
2

38
163b
163c
61
172b
172
172a
D1
31
7
180
181
136
42
13
41
54
33
REAR
Y
FRONT
112
134
135
37
32
103
52a
22a
21
22
X
1
2

38
163b
172b
D2
D1
31
7
54
180
136
181
REAR
13
33
Y
41
42
135
FRONT
134
112
37
32
103
11
21
22
22a
52a
X
1
2

CLUTCH DRIVER OF EMERGENCY CUT-OFF DEVICE

CROSS REFERENCE TO RELATED APPLICATIONS

This application is a National Stage of International Application No. PCT/JP2022/044553 filed Dec. 2, 2022.

TECHNICAL FIELD

The present disclosure relates to a clutch driver of an emergency cut-off device.

BACKGROUND ART

PTL 1 discloses an integrated drive generator (IDG) that transmits power, taken out from an aircraft engine, to a power generator through a constant speed drive (CSD). A coupling mechanism is located as a clutch at a power transmitting path between the aircraft engine and the CSD and couples the aircraft engine and the CSD so as to be able to cut off the power transmitting path.

According to this coupling mechanism, an outer peripheral surface of a partner shaft that is engaged with an input shaft includes a screw thread. When this screw thread of the partner shaft meshes with a screw thread of a state indicator that serves as a clutch driver, the partner shaft is separated from the input shaft, i.e., is disengaged from the input shaft. The state indicator includes: a cap fixed to an IDG casing; a first member; a second member inserted in the first member; and a third member in which the first and second members are inserted. The third member is integrally coupled to the first member. A front end portion of the third member includes a screw thread that is engageable with the screw thread of the partner shaft.

The first member is biased by a spring in such a direction as to project from the cap to the outside of the casing. The third member is biased by another spring in such a direction as to approach the screw thread of the partner shaft. In a stand-by state where the screw thread of the third member is away from the screw thread of the partner shaft, a plunger of a solenoid is locked to the first and third members at positions where the springs are compressed. A rear end of the first member projecting from the cap to the outside of the casing and a rear end of the second member projecting from the cap to the outside of the casing are located at the same position in a front-rear direction that is an axial direction of the state indicator.

In an operating state where the plunger of the solenoid retreats, the first member further moves from the cap to the outside of the casing, and the third member moves toward the partner shaft together with the second member, and thus, the screw thread of the third member meshes with the screw thread of the partner shaft. Therefore, the partner shaft which has been rotating together with the input shaft is separated from the input shaft, and this cuts off power transmission. At this time, the rear end of the first member that has moved to the outside of the casing and the rear end of the second member that has moved to the partner shaft are different in position from each other. Therefore, a worker who sees this positional difference can grasp that the state indicator is in the operating state.

CITATION LIST

Patent Literature

PTL 1: Japanese Laid-Open Patent Application Publication No. 2-108901

SUMMARY OF INVENTION

Technical Problem

However, to return the state indicator from the operating state to the stand-by state, it is necessary to perform work of pulling the second member from the cap to the outside of the casing to return the third member, integrated with the second member, to an original position and work of pushing the first member back to return the first member to an original position. Therefore, the operation performed by the worker to return the state indicator from the operating state to the stand-by state may be complex.

An object of one aspect of the present disclosure is to simplify work of returning a clutch driver of an emergency cut-off device from an operating state to a stand-by state.

Solution to Problem

A clutch driver of an emergency cut-off device according to one aspect of the present disclosure is a clutch driver that drives a clutch including an engaged body that rotates integrally with a first shaft and an engaging body that rotates integrally with a second shaft, includes a first screw thread on an outer peripheral surface of the engaging body, and is disengaged from the engaged body by being displaced in an axial direction in which an axis of the second shaft extends. The clutch driver includes: a base located away from the clutch in a front-rear direction perpendicular to the axial direction; a puller extending in the front-rear direction and located between the first screw thread and the base, the puller including a front end portion including a second screw thread that is meshable with the first screw thread, an internal space that extends in the front-rear direction and is open rearward, and a stopper that is lockable to an operator of an actuator when the second screw thread is located away from the first screw thread; a pushing spring that biases the puller toward the first screw thread; an outside shaft located in the internal space of the puller so as to be slidable relative to the puller in the front-rear direction, the outside shaft including an internal space that extends in the front-rear direction and is open rearward and a rear end portion that projects rearward from the base; an inside shaft that is located in the internal space of the outside shaft so as to be slidable relative to the outside shaft in the front-rear direction and is coupled to the puller so as to be displaced integrally with the puller in the front-rear direction, the inside shaft including a rear end portion that projects rearward from the base; and a positioner that positions the outside shaft. The clutch driver becomes a stand-by state when the pushing spring is compressed, the second screw thread is separated from the first screw thread, and the operator advances to be locked to the stopper. The clutch driver becomes an operating state when the operator retreats to be separated from the stopper, the puller moves forward by the pushing spring, and the second screw thread meshes with the first screw thread. When the clutch driver transitions from the stand-by state to the operating state, the positioner maintains a position of the outside shaft relative to the base in the front-rear direction.

Advantageous Effects of Invention

According to the aspect of the present disclosure, when the clutch driver transitions from the stand-by state to the operating state, the position of the outside shaft relative to the base is maintained. Therefore, when performing work of returning the clutch driver from the operating state to the stand-by state, it is enough to move the inside shaft rearward and lock the stopper of the puller, which is displaced integrally with the inside shaft, to the operator of the actuator. To be specific, when performing the work of returning the clutch driver from the operating state to the stand-by state, it is unnecessary to operate the outside shaft. Therefore, the work of returning the clutch driver of the emergency cut-off device from the operating state to the stand-by state can be simplified.

DESCRIPTION OF EMBODIMENTS

Hereinafter, embodiments will be described with reference to the drawings.

Figure 1:
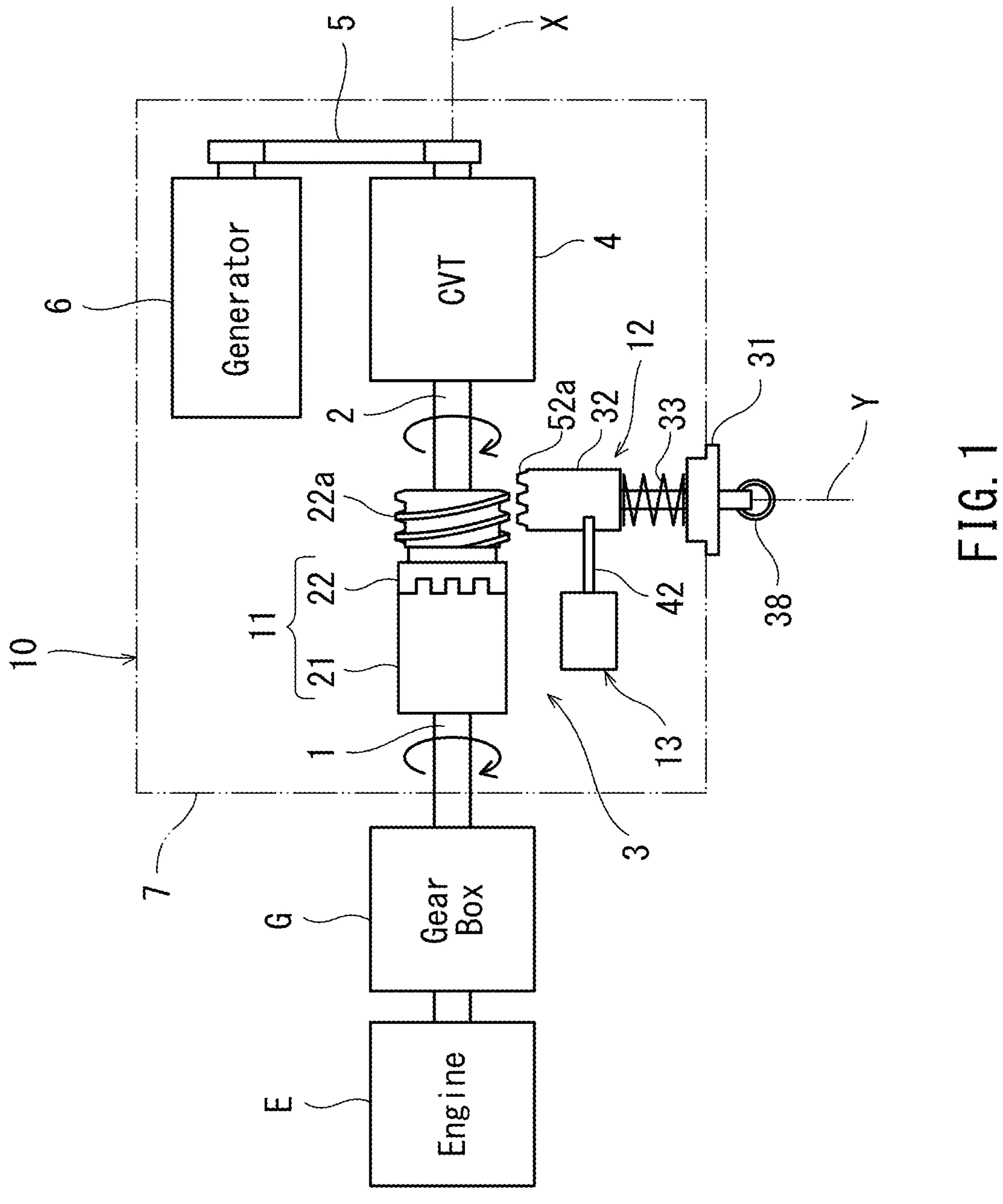
FIG. 1 is a schematic diagram of a drive mechanism-integrated electric power generating apparatus (IDG).
Figure 2:
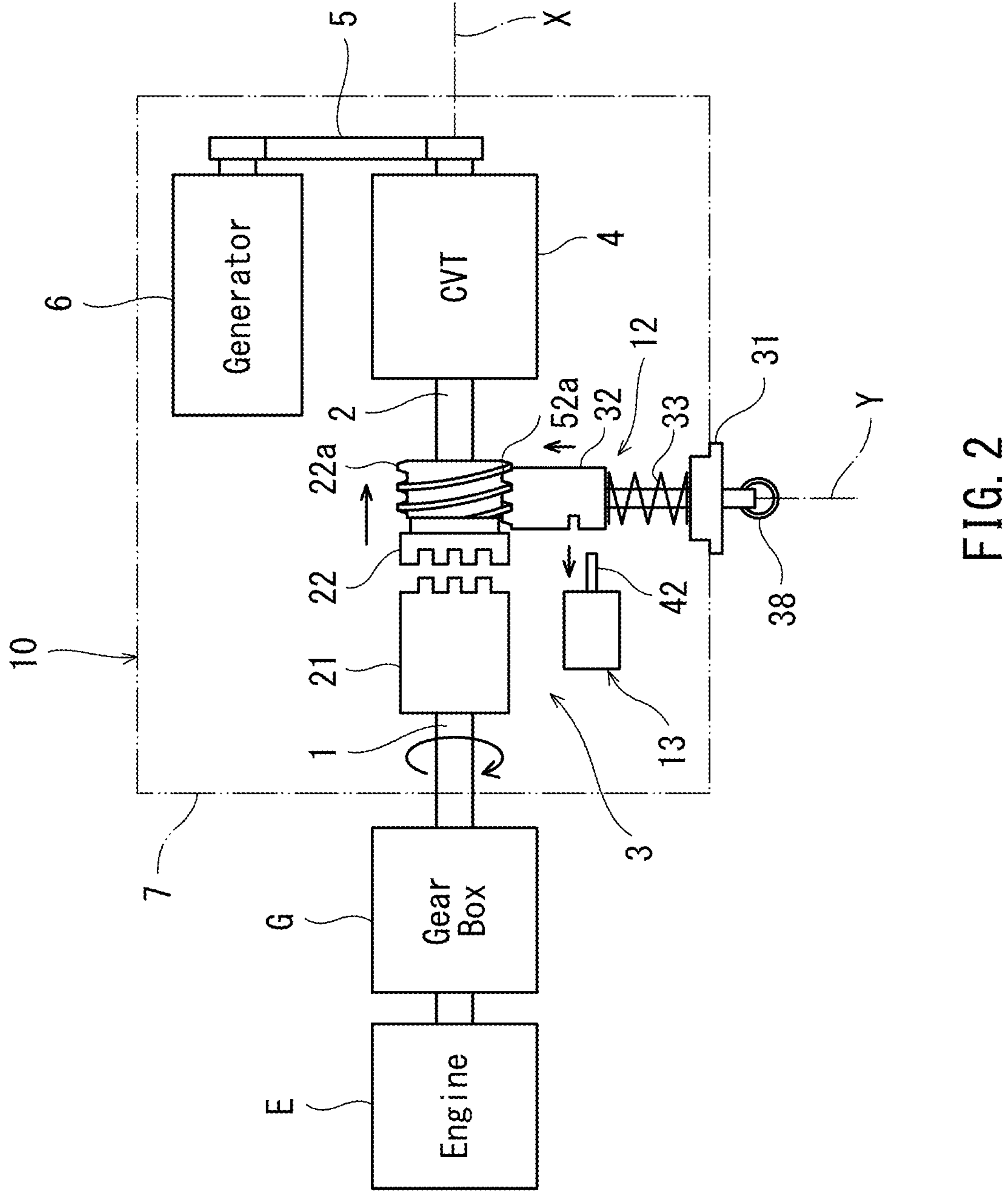
FIG. 2 is a schematic diagram showing a state where an emergency cut-off device of FIG. 1 operates.

FIG. 1 is a schematic diagram of a drive mechanism-integrated electric power generating apparatus 10. FIG. 2 is a schematic diagram showing a state where an emergency cut-off device 3 of FIG. 1 operates. As shown in FIG. 1, the drive mechanism-integrated electric power generating apparatus 10 (Integrated Drive Generator; hereinafter “IDG”) is mounted on an aircraft and generates electric power by rotational power taken out from an aircraft engine E. The rotational power from the aircraft engine E is input to the IDG 10 through a gear box G. The IDG 10 includes a first shaft 1, a second shaft 2, the emergency cut-off device 3, a continuously variable transmission 4, a power train 5, a power generator 6, and a casing 7. The first shaft 1 and the second shaft 2 are located on a same axis X and transmits the rotational power, output from the gear box G, to the continuously variable transmission 4. A direction in which the axis X extends is referred to as an axial direction X.

The continuously variable transmission 4 is controlled by a controller including processing circuitry and constitutes a constant speed drive. The continuously variable transmission 4 is, for example, a toroidal continuously variable transmission but may be another type of continuously variable transmission. The rotational power which has been changed in speed by the continuously variable transmission 4 is transmitted through the power train 5 to the power generator 6. The power generator 6 generates AC power at a frequency proportional to a rotational speed of the input rotational power. A change gear ratio of the continuously variable transmission 4 is continuously changed regardless of a change in the rotational speed of the aircraft engine E such that the rotational speed of the rotational power input to the power generator 6 is maintained at an appropriate value (value corresponding to a frequency at which electric components in the aircraft stably operate).

The emergency cut-off device 3 is located at a power transmitting path between the gear box G and the continuously variable transmission 4 and couples the gear box G and the continuously variable transmission 4 so as to be able to cut off the power transmitting path. The emergency cut-off device 3 includes a clutch 11, a clutch driver 12, and an actuator 13. The clutch 11 is located between the first shaft 1 and the second shaft 2. When the clutch 11 is in an engaged state, the rotational power is transmitted from the first shaft 1 to the second shaft 2. When the clutch 11 is in a disengaged state, the rotational power is not transmitted from the first shaft 1 to the second shaft 2.

The clutch 11 includes an engaged body 21 and an engaging body 22. The clutch 11 may be, for example, a dog clutch. The engaged body 21 is fixed to the first shaft 1 so as to rotate integrally with the first shaft 1. The engaging body 22 rotates integrally with the second shaft 2 and is slidable relative to the second shaft 2 in the axial direction X. For example, the engaging body 22 is splined to the second shaft 2 and is biased by a spring in such a direction as to approach the engaged body 21. To be specific, the engaging body 22 slides to approach the engaged body 21 in the axial direction X, and thus, is engaged with the engaged body 21. The engaging body 22 slides to be separated from the engaged body 21, and thus, is disengaged from the engaged body 21. The engaging body 22 includes a first screw thread **22*a*** on an outer peripheral surface thereof.

The clutch driver 12 extends in a direction Y perpendicular to the axial direction X. The present description focuses on the clutch driver 12, and an axial direction of the clutch driver 12 is defined as a front-rear direction Y. The clutch driver 12 includes a base 31, a puller 32, and a pushing spring 33. The base 31 is fixed to the casing 7. The puller 32 is slidable relative to the base 31 in the front-rear direction. The puller 32 is biased by the pushing spring 33 in such a direction as to approach the first screw thread **22*a*. The puller 32 includes a second screw thread 52*a* which is located at a front end portion thereof and is opposed to the first screw thread 22*a***.

The actuator 13 includes an operator 42 that is advanceable and retreatable. The actuator 13 is, for example, a solenoid. When the actuator 13 is the solenoid, the operator 42 is a plunger. As shown in FIG. 1, when the operator 42 of the actuator 13 is in an advanced state, the puller 32 is locked by the operator 42 and is maintained to be separated from the first screw thread **22*a*** (stand-by state).

As shown in FIG. 2, when the operator 42 of the actuator 13 becomes a retreated state, the puller 32 moves forward by the pushing spring 33, and the second screw thread 52*a* of the puller 32 meshes with the first screw thread 22*a* of the engaging body 22 (operating state). Thus, the first screw thread 22*a* is guided by the second screw thread 52*a* in accordance with the rotation of the engaging body 22, and the engaging body 22 is separated from the engaged body 21 in the axial direction X. To be specific, the first screw thread 22*a* and the second screw thread 52*a* serve as a worm drive, and the engaging body 22 is displaced in the axial direction X such that the engaged body 21 and the engaging body 22 are disengaged from each other.

Since most of the emergency cut-off device 3 is accommodated in the casing 7, the puller 32 of the clutch driver 12, the clutch 11, and the actuator 13 are hidden in the casing 7. To be specific, the puller 32 of the clutch driver 12, the clutch 11, and the actuator 13 are accommodated in the casing 7 and are not visible from the outside of the casing 7.

Embodiment 1

Figure 3:
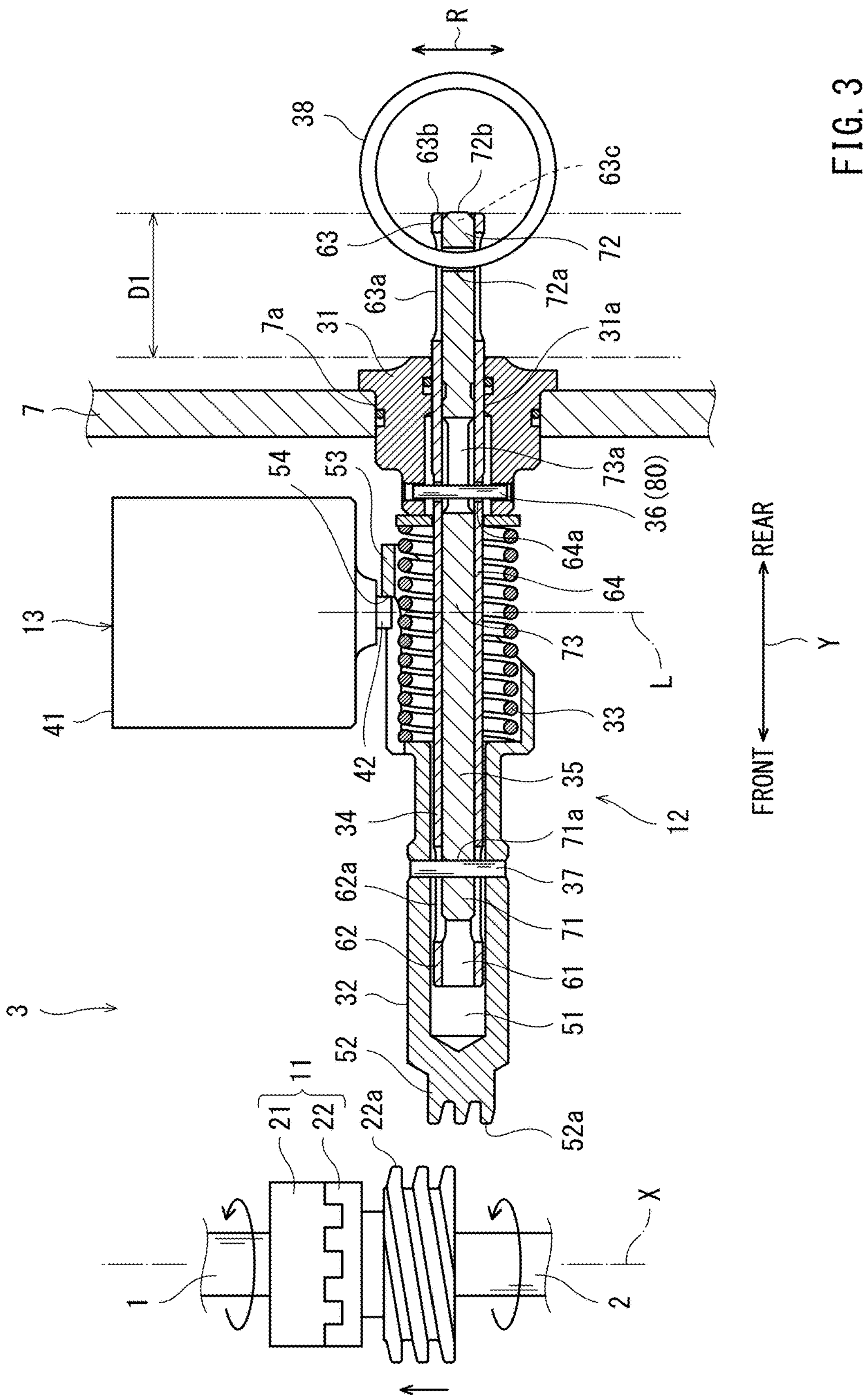
FIG. 3 is a sectional view showing a stand-by state of a clutch driver of the emergency cut-off device according to Embodiment 1.
Figure 4:
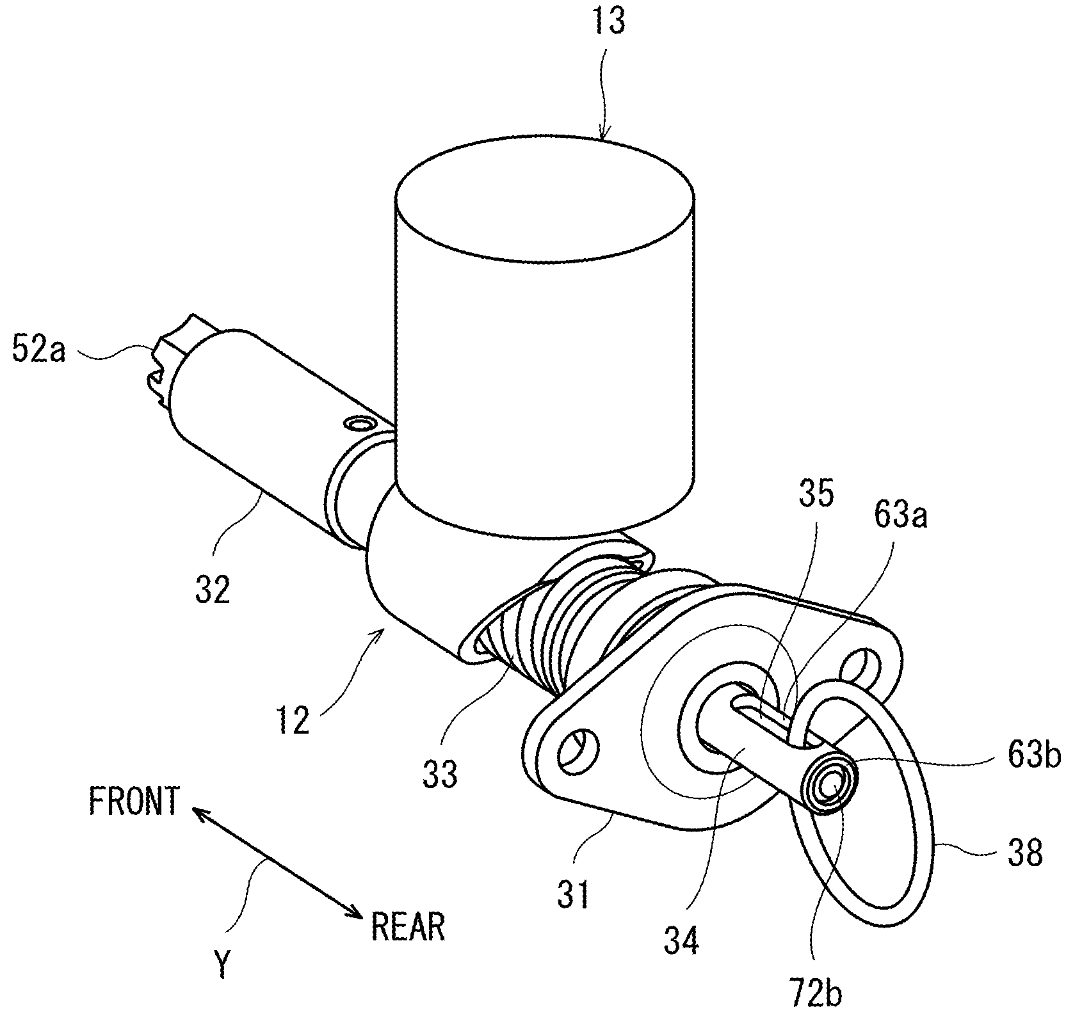
FIG. 4 is a perspective view of the clutch driver of FIG. 3.

FIG. 3 is a sectional view showing the stand-by state of the clutch driver 12 of the emergency cut-off device 3 according to Embodiment 1. FIG. 4 is a perspective view of the clutch driver 12 of FIG. 3. As shown in FIG. 3, the clutch driver 12 includes the base 31, the puller 32, the pushing spring 33, an outside shaft 34, an inside shaft 35, a positioner 36, a coupler 37, and a handle 38. The clutch driver 12 extends in a direction perpendicular to the axial direction X of the clutch 11, and a direction in which an axis Y of the clutch driver 12 extends is referred to as the front-rear direction Y.

The base 31 is in a fixing hole 7*a* of the casing 7 while being located away from the clutch 11 in the front-rear direction Y. The base 31 is fixed to the casing 7. The base 31 includes a through hole 31*a* that is open at both sides in the front-rear direction Y. A front end opening of the through hole 31*a* faces the inside of the casing 7, and a rear end opening of the through hole 31*a* faces the outside of the casing 7.

The puller 32 is located between the first screw thread 22*a* of the engaging body 22 and the base 31 and extends in the front-rear direction Y. The puller 32 includes an internal space 51, a front end portion 52, a rear end portion 53, and a stopper 54. The internal space 51 extends in the front-rear direction Y and is open rearward. The front end portion 52 closes a front side of the internal space 51. The front end portion 52 includes the second screw thread 52*a* at a front end thereof. The second screw thread 52*a* of the puller 32 is opposed to the first screw thread 22*a* of the engaging body 22 in the front-rear direction Y and has such a shape as to mesh with the first screw thread 22*a* of the engaging body 22.

The rear end portion 53 of the puller 32 is located in front of the base 31. The stopper 54 is located at the rear end portion 53. In a state where the second screw thread 52*a* is located away from the first screw thread 22*a* in the front-rear direction Y, the stopper 54 is locked, from behind, to the operator 42 of the actuator 13 which is in the advanced state. To be specific, the operator 42 of the actuator 13 which is in the advanced state is located on a movement trajectory of the stopper 54 in the front-rear direction Y.

The pushing spring 33 biases the puller 32 toward the first screw thread 22*a* of the engaging body 22. The pushing spring 33 is sandwiched between the base 31 and the puller 32 in the front-rear direction Y in a compressed state.

The outside shaft 34 is in the internal space 51 of the puller 32 so as to be slidable relative to the puller 32 in the front-rear direction Y. The outside shaft 34 is in the through hole 31*a* of the base 31. The outside shaft 34 is a hollow shaft. The outside shaft 34 includes an internal space 61, a front end portion 62, a rear end portion 63, and an intermediate portion 64. The internal space 61 extends in the front-rear direction Y and is open rearward. The internal space 61 is open forward but may be closed from the front side. The front end portion 62 is located in the internal space 51 of the puller 32. The front end portion 62 includes an elongated hole 62*a* extending in the front-rear direction Y.

The rear end portion 63 of the outside shaft 34 projects rearward from the base 31. To be specific, the rear end portion 63 is located outside the casing 7. The rear end portion 63 includes an elongated hole 63*a* that is open in a radial direction R orthogonal to the front-rear direction Y and extends in the front-rear direction Y. The elongated hole 63*a* is longer than a below-described attachment hole 72*a* of the inside shaft 35 in the front-rear direction. An inner peripheral surface 63*c* of the rear end portion 63 includes a second color (red, for example) that is different from a first color (green, for example) of a below-described rear end surface 72*b* of the inside shaft 35. The intermediate portion 64 is located between the front end portion 62 and the rear end portion 63 in the front-rear direction Y and includes an attachment hole 64*a* that is open in the radial direction R. The attachment hole 64*a* is, for example, a round hole having a perfect circle shape.

The inside shaft 35 is in the internal space 61 of the outside shaft 34 so as to be slidable relative to the outside shaft 34 in the front-rear direction Y. The inside shaft 35 is a solid shaft. The inside shaft 35 includes a front end portion 71, a rear end portion 72, and an intermediate portion 73. The front end portion 71 includes an attachment hole 71*a* that is open in the radial direction R. When viewed in the radial direction R, the attachment hole 71*a* of the front end portion 71 of the inside shaft 35 overlaps the elongated hole 62*a* of the front end portion 62 of the outside shaft 34. The rear end portion 72 of the inside shaft 35 is in the rear end portion 63 of the outside shaft 34 and projects rearward from the base 31.

The rear end portion 72 of the inside shaft 35 includes the attachment hole 72*a* that is open in the radial direction R. When viewed in the radial direction R, the attachment hole 72*a* of the rear end portion 72 of the inside shaft 35 overlaps the elongated hole 63*a* of the rear end portion 63 of the outside shaft 34. The attachment hole 72*a* is shorter than the elongated hole 63*a* in the front-rear direction Y. The attachment hole 72*a* is, for example, a round hole having a perfect circle shape. The rear end surface 72*b* of the rear end portion 72 includes the first color (green, for example) different from the second color (red, for example) that is the color of the inner peripheral surface 63*c* of the rear end portion 63 of the outside shaft 34. The intermediate portion 73 includes an elongated hole 73*a* that is open in the radial direction R and extends in the front-rear direction Y. When viewed in the radial direction R, the elongated hole 73*a* overlaps the attachment hole 64*a* of the intermediate portion 64 of the outside shaft 34. The elongated hole 73*a* is longer than the attachment hole 64*a* in the front-rear direction Y.

The positioner 36 positions the outside shaft 34 in the front-rear direction Y. In Embodiment 1, the positioner 36 is a coupler 80 that fixes the position of the outside shaft 34 relative to the base 31 in the front-rear direction Y. The coupler 80 is, for example, a coupling pin that is in the attachment hole 64*a* of the intermediate portion 64 of the outside shaft 34 and is fixed to the base 31. The coupler 80 inhibits the displacement of the outside shaft 34 relative to the base 31 in the front-rear direction Y. The coupler 80 extends through the elongated hole 73*a* of the intermediate portion 73 of the inside shaft 35. Therefore, the inside shaft 35 is displaceable relative to the coupler 80 in the front-rear direction Y.

The coupler 37 couples the inside shaft 35 to the puller 32 such that the inside shaft 35 is displaced integrally with the puller 32 in the front-rear direction Y. The coupler 37 is, for example, a coupling pin that is in the attachment hole 71*a* of the front end portion 71 of the inside shaft 35 and is fixed to the puller 32. The coupler 37 inhibits the displacement of the inside shaft 35 relative to the puller 32 in the front-rear direction Y. The coupler 37 extends through the elongated hole 62*a* of the front end portion 62 of the outside shaft 34. Therefore, the coupler 37 is displaceable relative to the outside shaft 34 in the front-rear direction Y.

The handle 38 is attached to the attachment hole 72*a* of the rear end portion 72 of the inside shaft 35. The handle 38 is held by a worker to reset the clutch driver 12. The handle 38 is, for example, a ring. The handle 38 extends through the elongated hole 63*a* of the rear end portion 63 of the outside shaft 34. Therefore, the handle 38 is displaceable relative to the outside shaft 34 in the front-rear direction Y.

The clutch driver 12 shown in FIG. 3 is in the "stand-by state." When the clutch driver 12 is in the stand-by state, the second screw thread 52*a* is located rearwardly away from the first screw thread 22*a*, and the pushing spring 33 is compressed. Then, the operator 42 of the actuator 13 advances to be locked to the stopper 54 of the puller 32. When the clutch driver 12 is in the stand-by state, the outside shaft 34 is located away from the operator 42 of the actuator 13. When the clutch driver 12 is in the stand-by state, the pushing spring 33 is located between the puller 32 and the outside shaft 34 on an extended line L of an operation trajectory of the operator 42. When the clutch driver 12 is in the stand-by state, the handle 38 is located in a rear region of the elongated hole 63*a* of the rear end portion 63 of the outside shaft 34.

When the clutch driver 12 is in the stand-by state, the rear end surface 72*b* of the inside shaft 35 and a rear end 63*b* of the outside shaft 34 are located at substantially the same position in the front-rear direction Y. At this time, a distance D1 from the base 31 to the rear end 63*b* of the outside shaft 34 in the front-rear direction Y is substantially the same as a distance D1 from the base 31 to the rear end surface 72*b* of the inside shaft 35 in the front-rear direction Y. As shown in FIGS. 3 and 4, when the worker at the outside of the casing 7 sees a rear end portion of the clutch driver 12 that is in the stand-by state, the worker visually recognizes the first color (green, for example) of the rear end surface 72*b* of the inside shaft 35. Thus, the worker can grasp that the clutch driver 12 is in the stand-by state.

Figure 5:
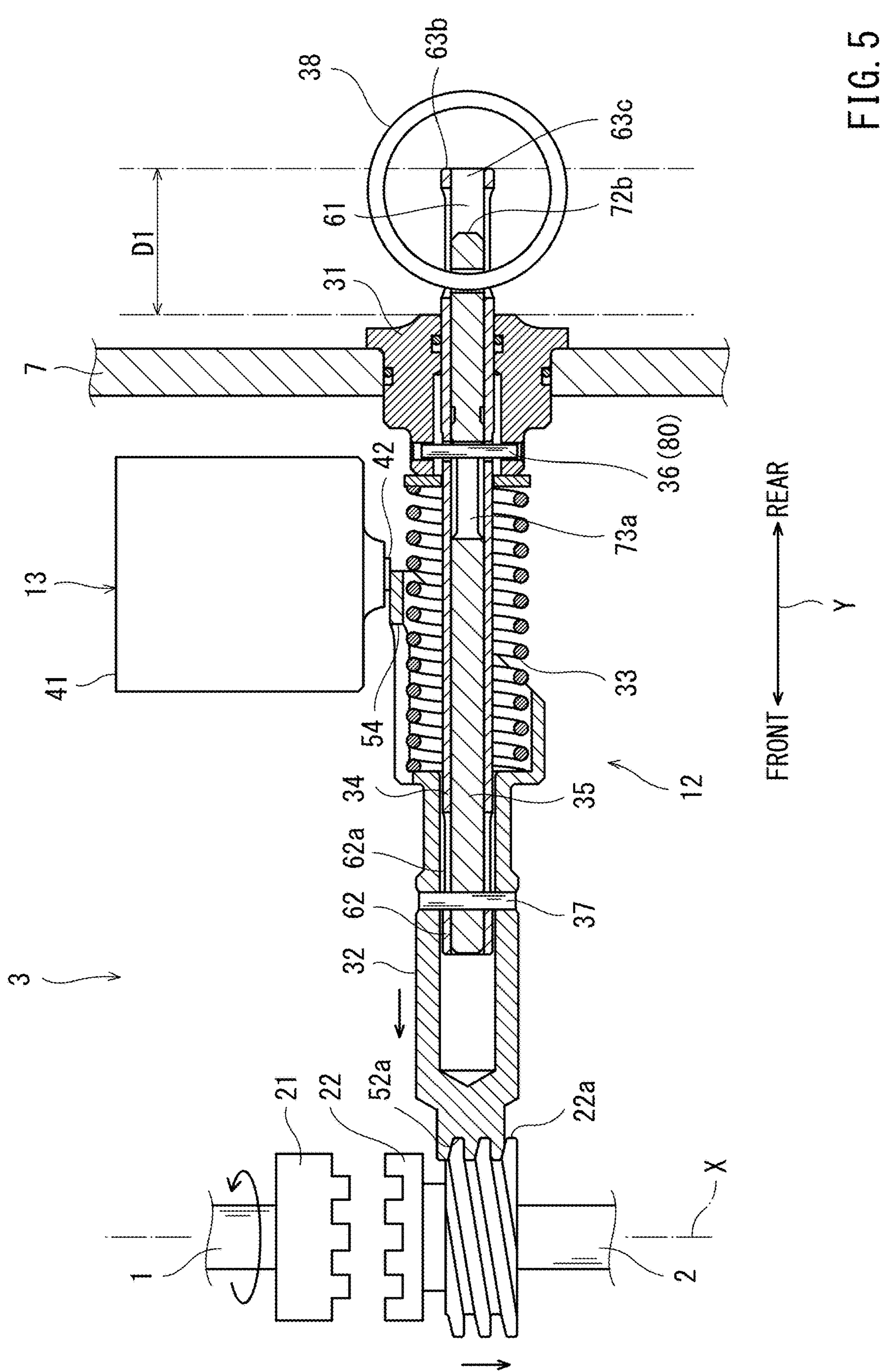
FIG. 5 is a sectional view showing an operating state of the clutch driver of FIG. 3.
Figure 6:
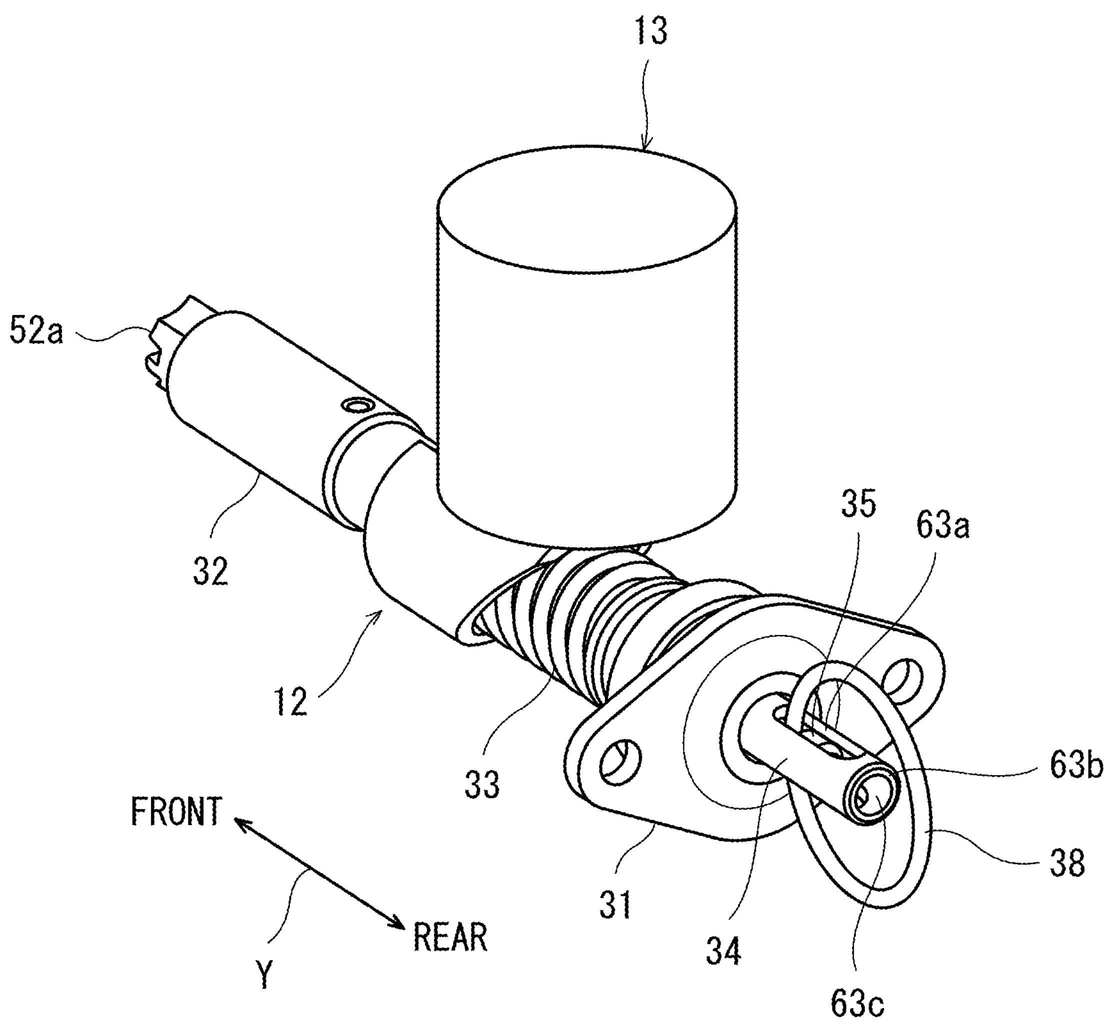
FIG. 6 is a perspective view of the clutch driver of FIG. 5.

FIG. 5 is a sectional view showing the operating state of the clutch driver 12 of FIG. 3. FIG. 6 is a perspective view of the clutch driver 12 of FIG. 5. As shown in FIG. 5, when an emergency cut-off signal for disengaging the clutch 11 is generated, the actuator 13 is controlled by the controller, and the clutch driver 12 becomes the "operating state." Specifically, the operator 42 of the actuator 13 retreats in a housing 41 so as to be located outside the movement trajectory of the stopper 54 of the puller 32. When the clutch driver 12 is in the operating state, the operator 42 of the actuator 13 which is in the retreated state is located away from the stopper 54, and the puller 32 moves forward by the pushing spring 33. Thus, the second screw thread 52*a* meshes with the first screw thread 22*a*.

The first screw thread 22*a* is guided by the second screw thread 52*a* in accordance with the rotation of the engaging body 22, and the engaging body 22 is displaced in the axial direction X so as to be separated from the engaged body 21. Thus, the engaged body 21 and the engaging body 22 are disengaged from each other, and the clutch 11 becomes the disengaged state.

When the clutch driver 12 transitions from the stand-by state to the operating state, the inside shaft 35 moves forward integrally with the puller 32 by the coupler 37. When the clutch driver 12 is in the operating state, the handle 38 is located in a front region of the elongated hole 63*a* of the rear end portion 63 of the outside shaft 34. When the clutch driver 12 is in the operating state, the coupler 37 is located in a front region of the elongated hole 62*a* of the front end portion 62 of the outside shaft 34. When the clutch driver 12 is in the operating state, the rear end surface 72*b* of the inside shaft 35 is located in front of the rear end 63*b* of the outside shaft 34. When the clutch driver 12 transitions from the stand-by state to the operating state, the coupler 80 that serves as the positioner 36 maintains the position of the outside shaft 34 relative to the base 31 in the front-rear direction Y. To be specific, even when the clutch driver 12 transitions from the stand-by state to the operating state, the distance D1 from the base 31 to the rear end 63*b* of the outside shaft 34 in the front-rear direction Y does not change.

As shown in FIGS. 5 and 6, when the clutch driver 12 transitions from the stand-by state to the operating state, the rear end surface 72*b* of the inside shaft 35 is sunk in the internal space 61 of the outside shaft 34. Therefore, when the worker sees the rear end portion of the clutch driver 12 that is in the operating state, the worker visually recognizes the second color (red, for example) of the inner peripheral surface 63*c* of the outside shaft 34. Thus, the worker can determine, based on the difference of the color that is seen at the rear end portion of the clutch driver 12, whether the clutch driver 12 is in the stand-by state or the operating state.

Figure 7:
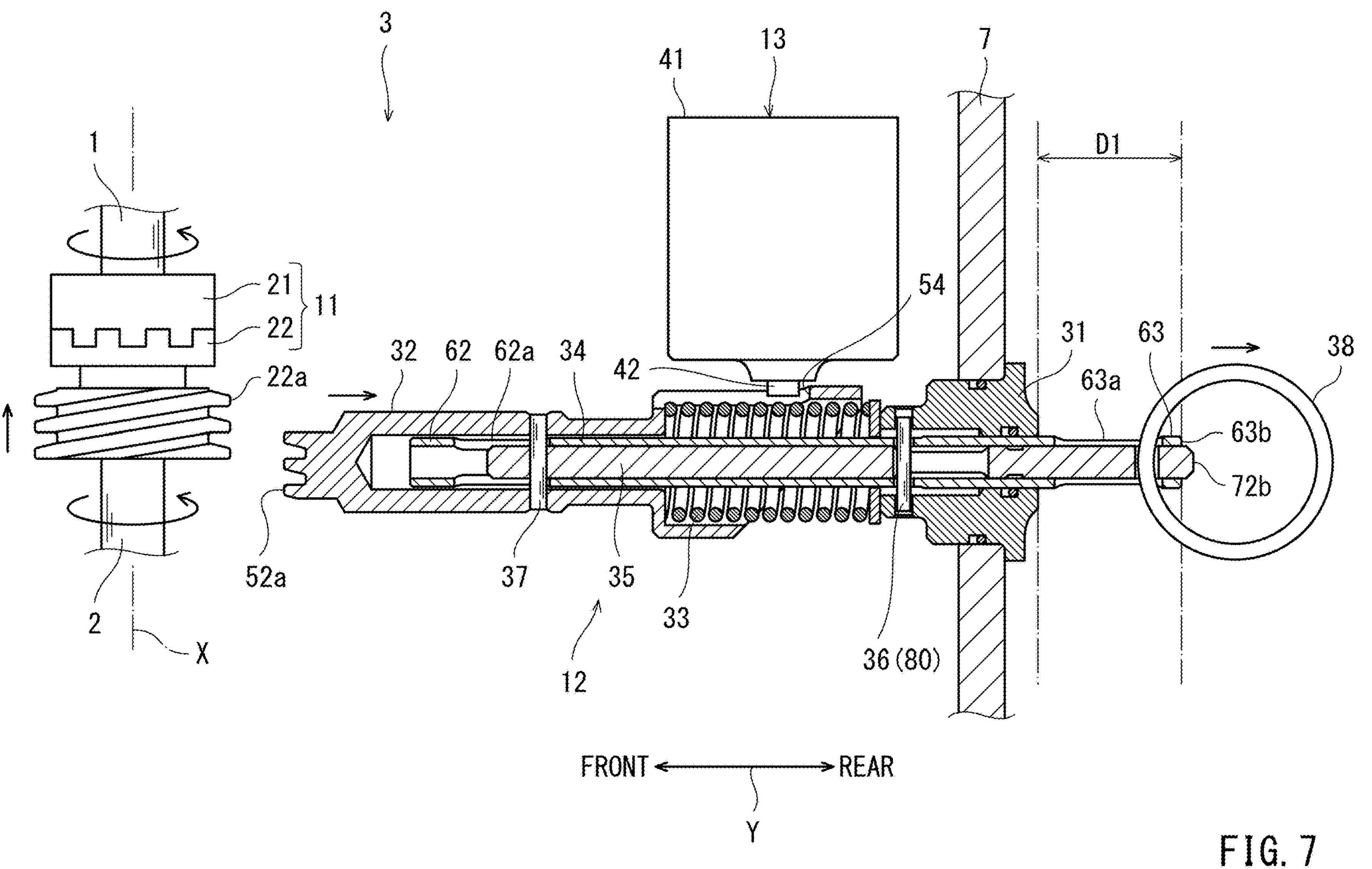
FIG. 7 is a sectional view showing a reset state of the clutch driver of FIG. 3.
Figure 8:
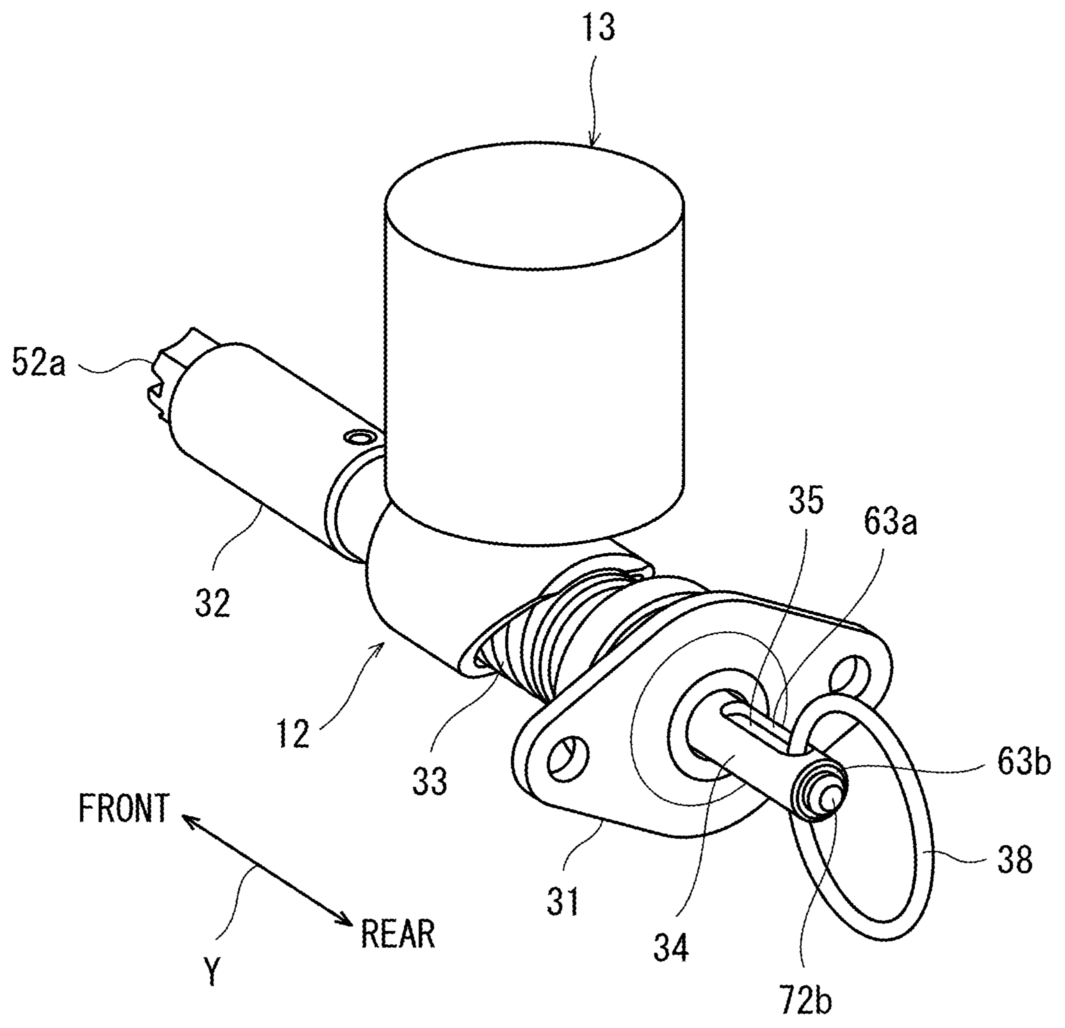
FIG. 8 is a perspective view of the clutch driver of FIG. 7.

FIG. 7 is a sectional view showing a reset state of the clutch driver 12 of FIG. 3. FIG. 8 is a perspective view of the clutch driver 12 of FIG. 7. As shown in FIG. 7, when the emergency cut-off signal disappears, the operator 42 of the actuator 13 becomes the advanced state. When the actuator 13 is the solenoid, and the emergency cut-off signal disappears, the solenoid becomes a non-conducting state, and the plunger advances from the housing 41 toward the clutch driver 12 by a spring. However, the plunger is retreatable by external force against the spring. When the worker pulls the handle 38 rearward until the handle 38 contacts a rear end edge of the elongated hole 63*a* of the rear end portion 63 of the outside shaft 34, the clutch driver 12 transitions from the operating state to the "reset state."

When the handle 38 is pulled rearward, the inside shaft 35 moves rearward. At this time, the puller 32 moves rearward together with the inside shaft 35 by the coupler 37 to compress the pushing spring 33. When the clutch driver 12 transitions from the operating state to the reset state, the stopper 54 contacts the operator 42 of the actuator 13 and pushes the operator 42 back into the housing 41. Thus, the stopper 54 moves rearward beyond the operator 42. When the clutch driver 12 is in the reset state, the handle 38 is located in the rear region of the elongated hole 63*a* of the rear end portion 63 of the outside shaft 34. When the clutch driver 12 is in the reset state, the coupler 37 is located in a rear region of the elongated hole 62*a* of the front end portion 62 of the outside shaft 34. When the clutch driver 12 is in the reset state, the rear end surface 72_b_ of the inside shaft 35 is located behind the rear end 63_b_ of the outside shaft 34.

When the clutch driver 12 transitions from the operating state to the reset state, the positioner 36 maintains the position of the outside shaft 34 relative to the base 31 in the front-rear direction Y. To be specific, even when the clutch driver 12 transitions from the operating state to the reset state, the distance D1 from the base 31 to the rear end 63_b_ of the outside shaft 34 in the front-rear direction Y does not change.

In a case where the worker releases the handle 38 when the clutch driver 12 is in the reset state, the puller 32 and the inside shaft 35 move forward by the biasing force of the pushing spring 33, and the stopper 54 contacts the operator 42 of the actuator 13. Thus, the puller 32 stops, and the clutch driver 12 returns to the stand-by state.

According to the above-described configuration, when the clutch driver 12 transitions from the stand-by state to the operating state, the position of the outside shaft 34 relative to the base 31 is maintained by the positioner 36. Therefore, when performing work of returning the clutch driver 12 from the operating state to the stand-by state, it is enough to move the inside shaft 35 rearward and lock the stopper 54 of the puller 32, which is displaced integrally with the inside shaft 35, to the operator 42 of the actuator 13. To be specific, when performing the work of returning the clutch driver 12 from the operating state to the stand-by state, it is unnecessary to operate the outside shaft 34. Therefore, the work of returning the clutch driver 12 of the emergency cut-off device 3 from the operating state to the stand-by state can be simplified.

Embodiment 2

Figure 9:
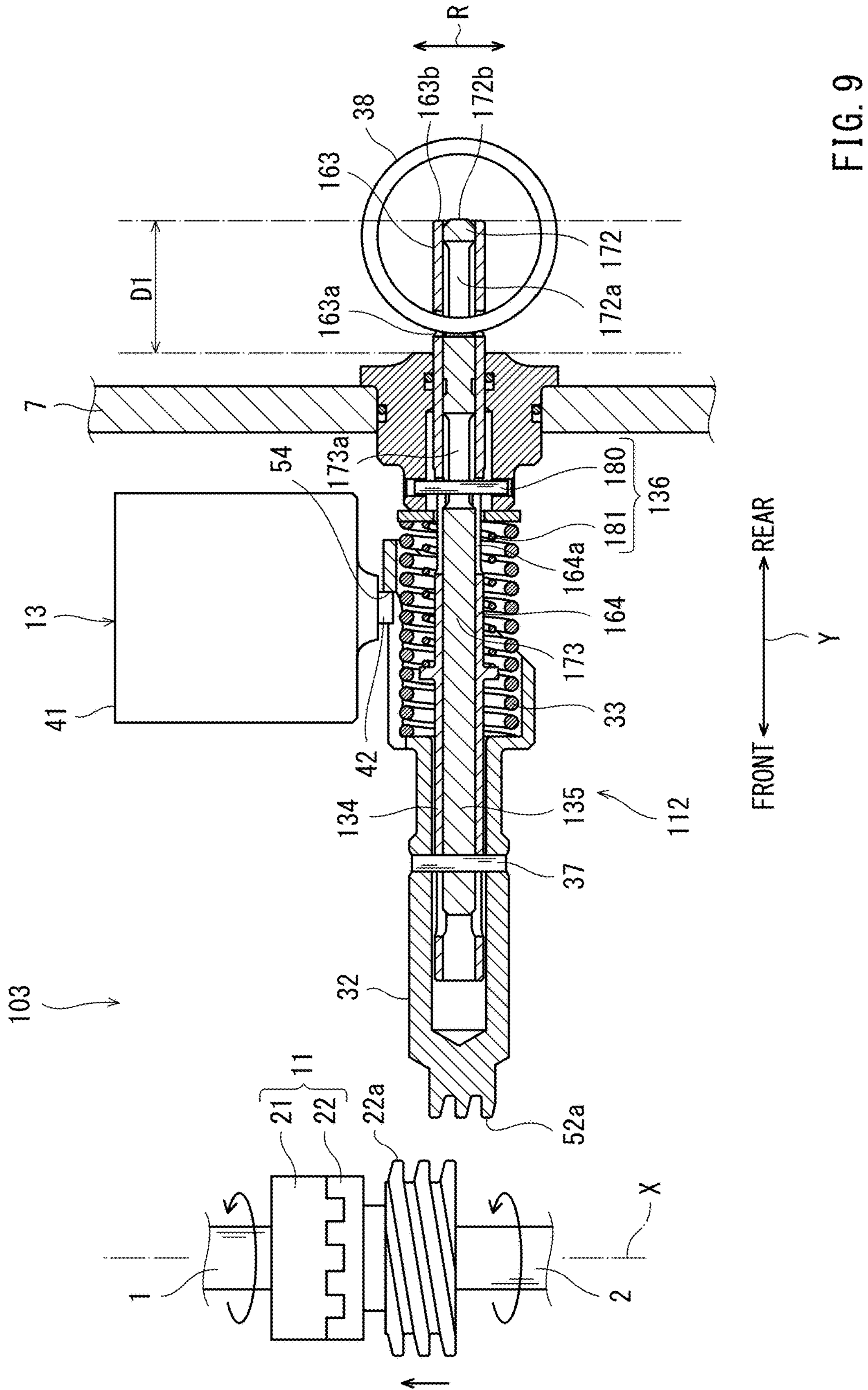
FIG. 9 is a sectional view showing the stand-by state of the clutch driver of the emergency cut-off device according to Embodiment 2.

FIG. 9 is a sectional view showing the stand-by state of a clutch driver 112 of the emergency cut-off device 3 according to Embodiment 2. The configuration of a positioner 136 of the clutch driver 112 and the attachment configuration of the handle 38 in Embodiment 2 are different from those in Embodiment 1. The same reference signs are used for the same components as Embodiment 1, and the repetition of the same explanation is avoided. As shown in FIG. 9, a rear end portion 163 of an outside shaft 134 includes an attachment hole 163_a_ to which the handle 38 is attached. A rear end portion 172 of an inside shaft 135 includes an elongated hole 172_a_ that is longer than the attachment hole 163_a_ of the rear end portion 163 of the outside shaft 134 in the front-rear direction. When the clutch driver 112 is in the stand-by state, the handle 38 is located in a front region of the elongated hole 172_a_ of the rear end portion 172 of the inside shaft 135.

An intermediate portion 164 of the outside shaft 134 includes an elongated hole 164_a_ extending in the front-rear direction Y. An intermediate portion 173 of the inside shaft 135 includes an elongated hole 173_a_ extending in the front-rear direction Y. A regulation pin 180 extending in the radial direction R is fixed to the base 31. The regulation pin 180 extends through the elongated hole 164_a_ and the elongated hole 173_a_. To be specific, the outside shaft 134 and the inside shaft 135 are displaceable relative to the base 31 in the front-rear direction Y within a predetermined range. When the clutch driver 112 is in the stand-by state, the regulation pin 180 is located in a rear region of the elongated hole 164_a_ of the intermediate portion 164 of the outside shaft 134 and a front region of the elongated hole 173_a_ of the intermediate portion 173 of the inside shaft 135. When the clutch driver 112 is in the stand-by state, the handle 38 is located in the front region of the elongated hole 172_a_ of the rear end portion 172 of the inside shaft 135.

The positioner 136 includes: a positioning spring 181 that biases the outside shaft 134 toward the first screw thread 22_a_; and the regulation pin 180. The positioning spring 181 is located inside the pushing spring 33 in the radial direction R. The outside shaft 134 that has been biased forward by the positioning spring 181 is positioned at a predetermined position by contacting the regulation pin 180 fixed to the base 31. Specifically, the outside shaft 134 that has been biased forward by the positioning spring 181 is positioned in such a manner that the regulation pin 180 contacts a rear end edge of the elongated hole 164_a_ of the outside shaft 134.

When the clutch driver 112 is in the stand-by state, a rear end surface 172_b_ of the inside shaft 135 is located at the same position in the front-rear direction Y as a rear end 163_b_ of the outside shaft 134. At this time, the distance D1 from the base 31 to the rear end 63_b_ of the outside shaft 34 in the front-rear direction Y is the same as the distance D1 from the base 31 to the rear end surface 72_b_ of the inside shaft 35 in the front-rear direction Y.

Figure 10:
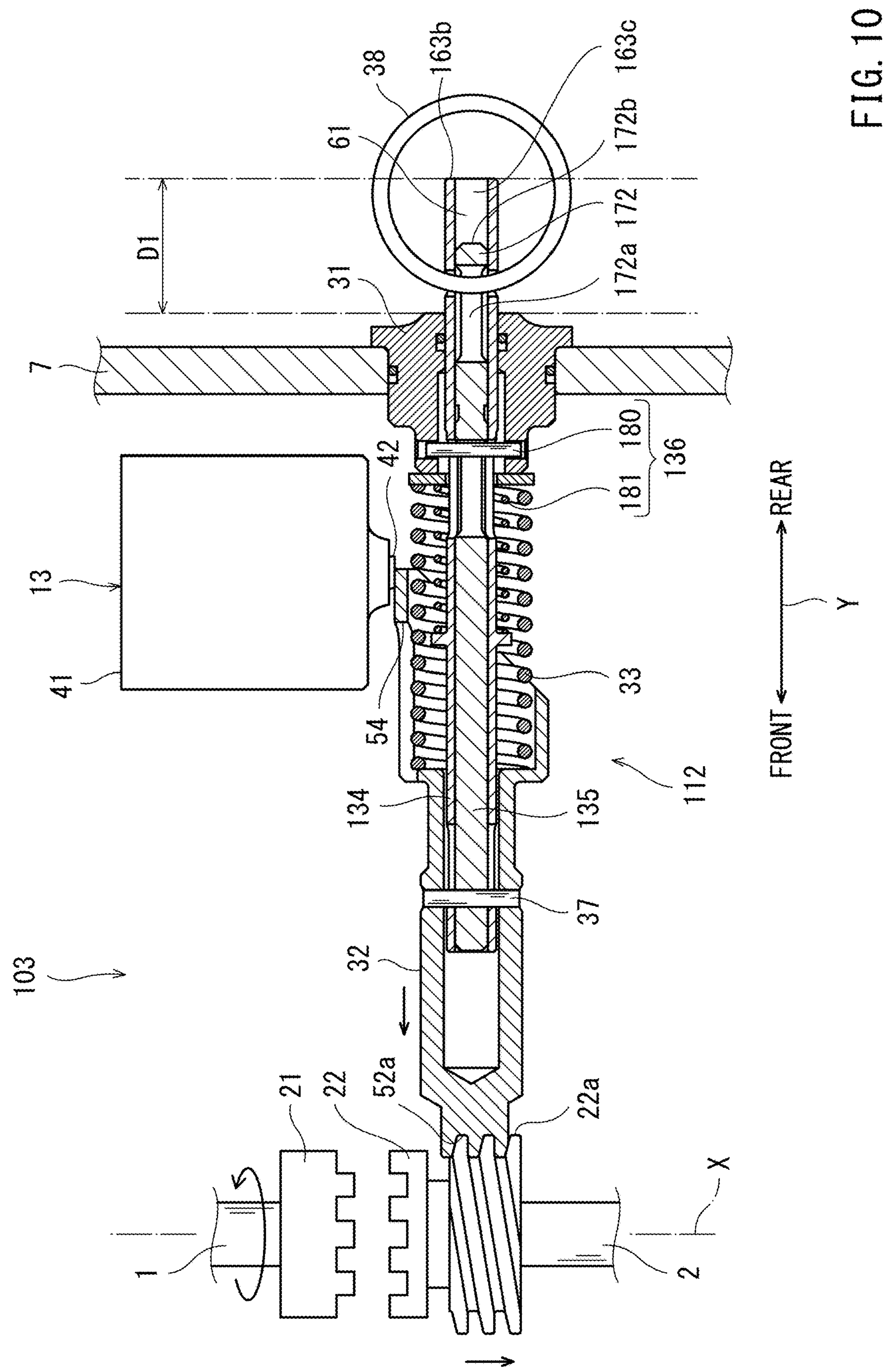
FIG. 10 is a sectional view showing the operating state of the clutch driver of FIG. 9.

FIG. 10 is a sectional view showing the operating state of the clutch driver 112 of FIG. 9. As shown in FIG. 10, when the operator 42 of the actuator 13 retreats in the housing 41 to be unlocked from the stopper 54, the clutch driver 12 becomes the "operating state." When the clutch driver 12 is in the operating state, the second screw thread 52_a_ of the puller 32 which has moved forward by the pushing spring 33 meshes with the first screw thread 22_a_, and the engaged body 21 and the engaging body 22 are disengaged from each other.

When the clutch driver 112 transitions from the stand-by state to the operating state, the inside shaft 135 moves forward integrally with the puller 32 by the coupler 37. When the clutch driver 112 is in the operating state, the handle 38 is located in a rear region of the elongated hole 172_a_ of the rear end portion 172 of the inside shaft 135. When the clutch driver 112 is in the operating state, the rear end surface 172_b_ of the inside shaft 135 is located in front of the rear end 163_b_ of the outside shaft 134. When the clutch driver 112 transitions from the stand-by state to the operating state, the positioning spring 181 that serves as the positioner 136 maintains the position of the outside shaft 134 relative to the base 31 in the front-rear direction Y. To be specific, even when the clutch driver 112 transitions from the stand-by state to the operating state, the distance D1 from the base 31 to the rear end 163_b_ of the outside shaft 134 in the front-rear direction Y does not change.

When the clutch driver 112 transitions from the stand-by state to the operating state, the rear end surface 172_b_ of the inside shaft 135 is sunk in the internal space 61 of the outside shaft 134. Therefore, when the worker sees the rear end portion of the clutch driver 112 that is in the operating state, the worker visually recognizes the second color (red, for example) of an inner peripheral surface 163_c_ of the rear end portion 163 of the outside shaft 134. Thus, the worker can determine, based on the difference of the color that is seen at the rear end portion of the clutch driver 112, whether the clutch driver 112 is in the stand-by state or the operating state.

Figure 11:
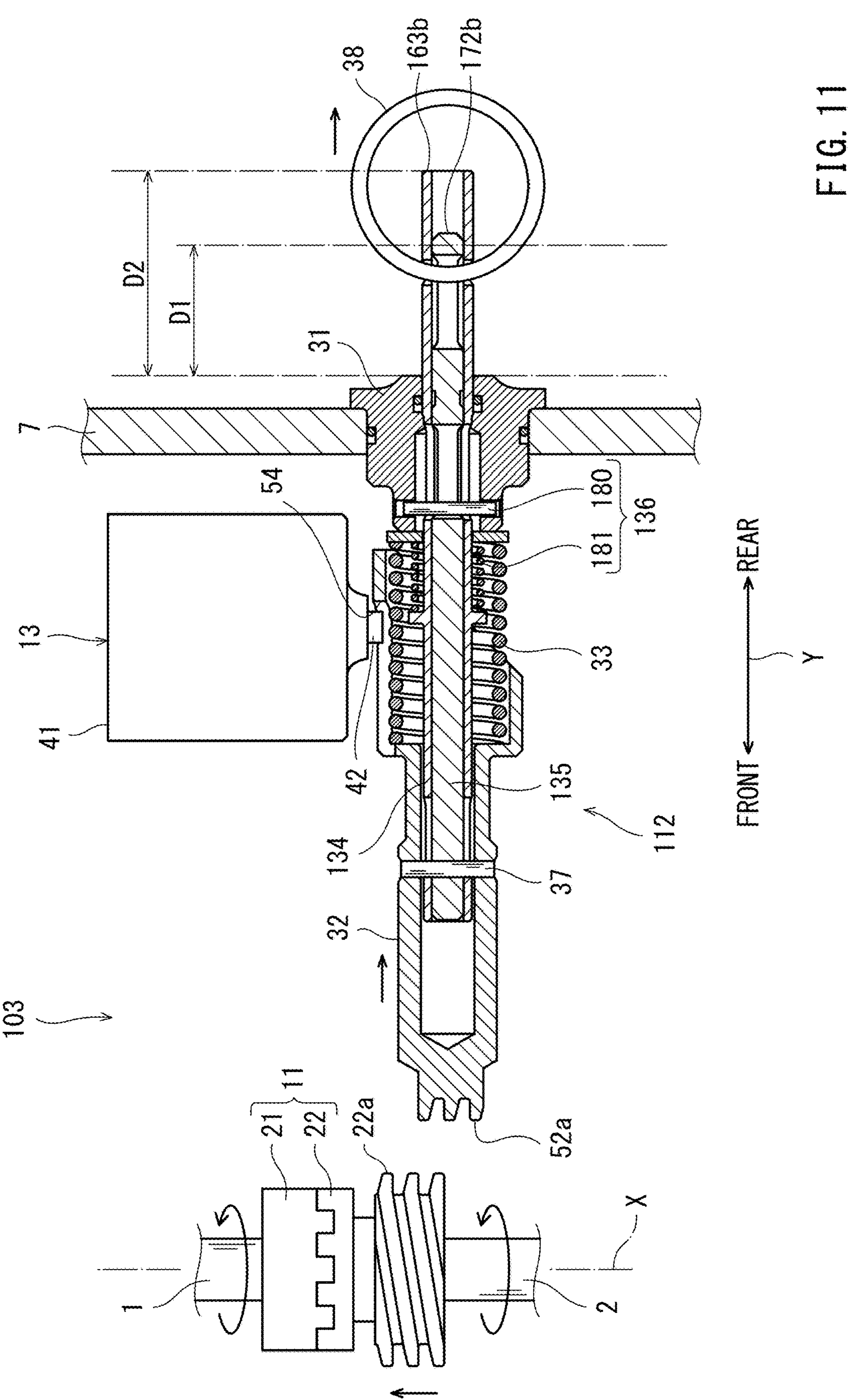
FIG. 11 is a sectional view showing the reset state of the clutch driver of FIG. 9.

FIG. 11 is a sectional view showing the reset state of the clutch driver 112 of FIG. 9. As shown in FIG. 11, when the worker pulls the handle 38 rearward, the clutch driver 112 transitions from the operating state to the "reset state." When the handle 38 is pulled rearward, both of the outside shaft 134 and the inside shaft 135 move rearward, and this compresses the pushing spring 33 and the positioning spring 181. A distance D2 from the base 31 to the rear end 63*b* of the outside shaft 34 in the front-rear direction Y when the clutch driver 112 is in the reset state is longer than the distance D1 from the base 31 to the rear end 63*b* of the outside shaft 34 in the front-rear direction Y when the clutch driver 112 is in the stand-by state or the operating state.

In a case where the worker releases the handle 38 when the clutch driver 112 is in the reset state, the inside shaft 135 moves forward by the positioning spring 181, and the puller 32 moves forward by the pushing spring 33. Then, the stopper 54 is locked to the operator 42 of the actuator 13, and the puller 32 stops. Thus, the clutch driver 12 returns to the stand-by state.

According to the above-described configuration, the biasing force of the positioning spring 181 acts so as to maintain the position of the outside shaft 134 relative to the base 31. Therefore, when performing the work of returning the clutch driver 112 from the operating state to the stand-by state, it is unnecessary to operate the outside shaft 134. Thus, the work of returning the clutch driver 112 of the emergency cut-off device 3 from the operating state to the stand-by state can be simplified. Since the other components are the same as those in Embodiment 1, explanations thereof are omitted.

The technology of the present disclosure is not limited to the above embodiments. For example, the outside shaft 34, 134 may be made short in the front-rear direction Y instead of locating the elongated hole 62*a* at the front end portion 62 of the outside shaft 34, 134. To be specific, a front end of the outside shaft 34, 134 may be located behind the coupler 37 that couples the front end portion 71 of the inside shaft 35, 135 and the puller 32. When the clutch driver 12 is in the stand-by state, the rear end surface 72*b*, 172*b* of the inside shaft 35, 135 may be located behind the rear end 63*b*, 163*b* of the outside shaft 34, 134. It is preferable that when the clutch driver 12 is in the stand-by state, the worker cannot see the inner peripheral surface 63*c*, 163*c* of the rear end portion 63, 163 of the outside shaft 34, 134.

The shape of the handle 38 is not limited to a ring shape and may be another shape (such as a square frame shape, a bar shape, or an L shape). Each of the couplers 37 and 80 may be, for example, a bolt instead of the coupling pin. The actuator 13 does not have to be the solenoid and may be another linear motion actuator that makes the operator 42 linearly advance or retreat. The actuator 13 may be a rotary actuator as long as the operator is movable between a position where the operator interferes with the stopper 54 and a position where the operator does not interfere with the stopper 54.

The color of the rear end surface 72*b*, 172*b* of the inside shaft 35, 135 may be the same as the color of the inner peripheral surface of the inner peripheral surface 63*c*, 163*c* of the rear end portion 63, 163 of the outside shaft 34, 134. To be specific, the worker may determine the state of the clutch driver 12, 112 by visually recognizing a positional relation between the rear end of the inside shaft 35, 135 and the rear end of the outside shaft 34, 134.

The regulation pin 180 of the clutch driver 112 in Embodiment 2 does not have to be a pin. The regulation pin 180 may be a regulation member that receives the outside shaft 134, which has been biased forward by the positioning spring 181, at a predetermined position. The regulation member may be part of the base 31 instead of being fixed to the base 31.

The foregoing has described the embodiments as examples of the technology disclosed in the present application. However, the technology in the present disclosure is not limited to these and is applicable to embodiments in which modifications, replacements, additions, omissions, and the like have been suitably made. Moreover, a new embodiment may be prepared by combining the components described in the above embodiments. For example, some of components or methods in one embodiment may be applied to another embodiment. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

The following aspects disclose preferred embodiments.

First Aspect

A clutch driver of an emergency cut-off device,
the clutch driver driving a clutch,
the clutch including
- an engaged body that rotates integrally with a first shaft and
- an engaging body that rotates integrally with a second shaft, includes a first screw thread on an outer peripheral surface of the engaging body, and is disengaged from the engaged body by being displaced in an axial direction in which an axis of the second shaft extends, the clutch driver including:
- a base located away from the clutch in a front-rear direction perpendicular to the axial direction;
- a puller extending in the front-rear direction and located between the first screw thread and the base, the puller including
  - a front end portion including a second screw thread that is meshable with the first screw thread,
  - an internal space that extends in the front-rear direction and is open rearward, and
  - a stopper that is lockable to an operator of an actuator when the second screw thread is located away from the first screw thread;
- a pushing spring that biases the puller toward the first screw thread;
- an outside shaft located in the internal space of the puller so as to be slidable relative to the puller in the front-rear direction, the outside shaft including
  - an internal space that extends in the front-rear direction and is open rearward and
  - a rear end portion that projects rearward from the base;
- an inside shaft that is located in the internal space of the outside shaft so as to be slidable relative to the outside shaft in the front-rear direction and is coupled to the puller so as to be displaced integrally with the puller in the front-rear direction, the inside shaft including a rear end portion that projects rearward from the base; and
- a positioner that positions the outside shaft, wherein:
- the clutch driver becomes a stand-by state when the pushing spring is compressed, the second screw thread is separated from the first screw thread, and the operator advances to be locked to the stopper;
- the clutch driver becomes an operating state when the operator retreats to be separated from the stopper, the puller moves forward by the pushing spring, and the second screw thread meshes with the first screw thread; and when the clutch driver transitions from the stand-by state to the operating state, the positioner maintains a position of the outside shaft relative to the base in the front-rear direction.

According to this configuration, when the clutch driver transitions from the stand-by state to the operating state, the position of the outside shaft relative to the base is maintained. Therefore, when performing work of returning the clutch driver from the operating state to the stand-by state, it is enough to move the inside shaft rearward and lock the stopper of the puller, which is displaced integrally with the inside shaft, to the operator of the actuator. To be specific, when performing the work of returning the clutch driver from the operating state to the stand-by state, it is unnecessary to operate the outside shaft. Therefore, the work of returning the clutch driver of the emergency cut-off device from the operating state to the stand-by state can be simplified.

Second Aspect

The clutch driver according to the first aspect, wherein when the clutch driver is in the stand-by state, the outside shaft is located away from the operator of the actuator.

According to this configuration, when the clutch driver is in the stand-by state, the operator is not locked to the outside shaft. Therefore, the outside shaft does not have to include a locking hole to which the operator is locked. Moreover, it is unnecessary to position the locking hole of the outside shaft with respect to the operator for the purpose of setting the clutch driver to the stand-by state. Therefore, the outside shaft can be simplified, and the work of returning the clutch driver from the operating state to the stand-by state can be simplified.

Third Aspect

The clutch driver according to the first or second aspect, wherein when the clutch driver is in the stand-by state, the pushing spring is located between the puller and the outside shaft on an extended line of an operation trajectory of the operator.

According to this configuration, when the clutch driver is in the stand-by state, the operator is not locked to the outside shaft. Therefore, the outside shaft does not have to include a locking hole to which the operator is locked. Moreover, it is unnecessary to position the locking hole of the outside shaft with respect to the operator for the purpose of setting the clutch driver to the stand-by state. Therefore, the outside shaft can be simplified, and the work of returning the clutch driver from the operating state to the stand-by state can be simplified.

Fourth Aspect

The clutch driver according to any one of the first to third aspects, further including a handle, wherein:

the rear end portion of the inside shaft includes an attachment hole to which the handle is attached;

the rear end portion of the outside shaft includes an elongated hole that is longer than the attachment hole in the front-rear direction;

when the clutch driver is in the stand-by state, the handle is located in a rear region of the elongated hole;

when the clutch driver is in the operating state, the handle is located in a front region of the elongated hole; and the positioner includes a coupler that fixes the position of the outside shaft relative to the base in the front-rear direction.

According to this configuration, when the clutch driver becomes the operating state, the worker pulls the handle rearward. Thus, the puller moves rearward together with the inside shaft such that the second screw thread is separated from the first screw thread. Therefore, the stopper can be moved to a position behind the operator of the actuator (reset state). Then, when the worker releases the handle, the puller moves forward by the pushing spring, and the stopper is locked to the operator. Thus, the puller stops, and the clutch driver returns to the stand-by state. Therefore, the clutch driver can smoothly return from the operating state through the reset state to the stand-by state by the operation of the handle.

Fifth Aspect

The clutch driver according to any one of the first to third aspects, further including a handle, wherein:

the rear end portion of the outside shaft includes an attachment hole to which the handle is attached;

the rear end portion of the inside shaft includes an elongated hole that is longer than the attachment hole in the front-rear direction;

when the clutch driver is in the stand-by state, the handle is located in a front region of the elongated hole;

when the clutch driver is in the operating state, the handle is located in a rear region of the elongated hole; and the positioner includes a positioning spring that biases the outside shaft toward the first screw thread.

According to this configuration, when the clutch driver becomes the operating state, the worker pulls the handle rearward. Thus, the puller moves rearward together with the inside shaft such that the second screw thread is separated from the first screw thread. Therefore, the stopper can be moved to a position behind the operator of the actuator (reset state). Then, when the worker releases the handle, the puller moves forward by the pushing spring, and the stopper is locked to the operator. Thus, the puller stops, and the inside shaft moves forward by the positioning spring. Therefore, the clutch driver returns to the stand-by state. Thus, the clutch driver can return from the operating state through the reset state to the stand-by state by the operation of the handle, and the worker can obtain satisfactory operational feeling.

Sixth Aspect

The clutch driver according to any one of the first to fifth aspects, wherein:

when the clutch driver is in the stand-by state, an end surface of the rear end portion of the inside shaft is located at the same position as an end of the rear end portion of the outside shaft in the front-rear direction or is located behind the end of the rear end portion of the outside shaft;

when the clutch driver is in the operating state, a rear end surface of the rear end portion of the inside shaft is located in front of a rear end of the rear end portion of the outside shaft;

the rear end surface of the rear end portion of the inside shaft includes a first color; and an inner peripheral surface of the rear end portion of the outside shaft includes a second color different from the first color.

According to this configuration, when the worker sees the rear end portion of the clutch driver that is in the stand-by state, the worker can visually recognize the first color (green, for example) of the rear end surface of the inside shaft. On the other hand, when the worker sees the rear end portion of the clutch driver that is in the operating state, the rear end surface of the inside shaft is sunk in the internal space of the outside shaft. Therefore, the worker can visually recognize the second color (red, for example) of the inner peripheral surface of the outside shaft. Thus, the worker can determine, based on the difference of the color that is seen, whether the clutch driver is in the stand-by state or the operating state.

The invention claimed is:

1. A clutch driver of an emergency cut-off device,
the clutch driver driving a clutch,
the clutch including
an engaged body that rotates integrally with a first shaft and
an engaging body that rotates integrally with a second shaft, includes a first screw thread on an outer peripheral surface of the engaging body, and is disengaged from the engaged body by being displaced in an axial direction in which an axis of the second shaft extends,
the clutch driver comprising:
a base located away from the clutch in a front-rear direction perpendicular to the axial direction;
a puller extending in the front-rear direction and located between the first screw thread and the base, the puller including
a front end portion including a second screw thread that is meshable with the first screw thread,
an internal space that extends in the front-rear direction and is open rearward, and
a stopper that is lockable to an operator of an actuator when the second screw thread is located away from the first screw thread;
a pushing spring that biases the puller toward the first screw thread;
an outside shaft located in the internal space of the puller so as to be slidable relative to the puller in the front-rear direction, the outside shaft including
an internal space that extends in the front-rear direction and is open rearward and
a rear end portion that penetrates the base and projects rearward from the base;
an inside shaft that is located in the internal space of the outside shaft so as to be slidable relative to the outside shaft in the front-rear direction and is coupled to the puller so as to be displaced integrally with the puller in the front-rear direction, the inside shaft including a rear end portion that penetrates the base and projects rearward from the base; and
a positioner that positions the outside shaft, wherein:
the clutch driver becomes a stand-by state when the pushing spring is compressed, the second screw thread is separated from the first screw thread, and the operator advances to be locked to the stopper;
the clutch driver becomes an operating state when the operator retreats to be separated from the stopper, the puller moves forward by the pushing spring, and the second screw thread meshes with the first screw thread; and
when the clutch driver transitions from the stand-by state to the operating state, the positioner maintains a position of the outside shaft relative to the base in the front-rear direction.

2. The clutch driver according to claim 1, wherein when the clutch driver is in the stand-by state, the outside shaft is located away from the operator of the actuator.

3. The clutch driver according to claim 1, wherein when the clutch driver is in the stand-by state, the pushing spring is located between the puller and the outside shaft on an extended line of an operation trajectory of the operator.

4. The clutch driver according to claim 1, further comprising a handle, wherein:
the rear end portion of the inside shaft includes an attachment hole to which the handle is attached;
the rear end portion of the outside shaft includes an elongated hole that is longer than the attachment hole in the front-rear direction;
when the clutch driver is in the stand-by state, the handle is located in a rear region of the elongated hole;
when the clutch driver is in the operating state, the handle is located in a front region of the elongated hole; and
the positioner includes a coupler that fixes the position of the outside shaft relative to the base in the front-rear direction.

5. The clutch driver according to claim 1, further comprising a handle, wherein:
the rear end portion of the outside shaft includes an attachment hole to which the handle is attached;
the rear end portion of the inside shaft includes an elongated hole that is longer than the attachment hole in the front-rear direction;
when the clutch driver is in the stand-by state, the handle is located in a front region of the elongated hole;
when the clutch driver is in the operating state, the handle is located in a rear region of the elongated hole; and
the positioner includes a positioning spring that biases the outside shaft toward the first screw thread.

6. The clutch driver according to claim 1, wherein:
when the clutch driver is in the stand-by state, a rear end surface of the rear end portion of the inside shaft is located at the same position as a rear end of the rear end portion of the outside shaft in the front-rear direction or is located behind the rear end of the rear end portion of the outside shaft;
when the clutch driver is in the operating state, the rear end surface of the rear end portion of the inside shaft is located in front of the rear end of the rear end portion of the outside shaft;
the rear end surface of the rear end portion of the inside shaft includes a first color; and
an inner peripheral surface of the rear end portion of the outside shaft includes a second color different from the first color.

* * * * *